US008493986B2

(12) United States Patent
Shrum, Jr. et al.

(10) Patent No.: US 8,493,986 B2
(45) Date of Patent: Jul. 23, 2013

(54) SERVICE GATEWAYS FOR PROVIDING BROADBAND COMMUNICATION

(75) Inventors: Edgar V. Shrum, Jr., Smyrna, GA (US); Francisco Gonzalez, Atlanta, GA (US); John Civiletto, Suwanee, GA (US)

(73) Assignee: Cox Communications, Inc., Atlanta, GA (US)

(*) Notice: Subject to any disclaimer, the term of this patent is extended or adjusted under 35 U.S.C. 154(b) by 373 days.

(21) Appl. No.: 12/833,157

(22) Filed: Jul. 9, 2010

(65) Prior Publication Data

US 2011/0280249 A1    Nov. 17, 2011

Related U.S. Application Data

(60) Provisional application No. 61/345,245, filed on May 17, 2010.

(51) Int. Cl.
*H04L 12/28* (2006.01)
*H04J 1/16* (2006.01)

(52) U.S. Cl.
USPC ............ 370/401; 370/419; 370/463; 370/487

(58) Field of Classification Search
USPC .................................. 370/401, 463, 419, 487
See application file for complete search history.

(56) References Cited

U.S. PATENT DOCUMENTS

| 3,886,454 | A | 5/1975 | Oakley |
| 5,408,259 | A | 4/1995 | Warwick |
| 5,528,582 | A | 6/1996 | Bodeep et al. |
| 5,774,458 | A | 6/1998 | Williamson |
| 5,822,677 | A | 10/1998 | Peyrovian |
| 5,864,748 | A | 1/1999 | Dail |
| 6,348,837 | B1 | 2/2002 | Ibelings |
| 6,948,000 | B2 | 9/2005 | Desai et al. |
| 7,412,169 | B2 | 8/2008 | Joo et al. |
| 7,748,023 | B2 | 6/2010 | Weinstein et al. |
| 2004/0103442 | A1 | 5/2004 | Eng |
| 2004/0264683 | A1 | 12/2004 | Bye |
| 2005/0069317 | A1 | 3/2005 | Lee et al. |
| 2005/0203647 | A1* | 9/2005 | Landry et al. .................... 700/83 |
| 2009/0070477 | A1* | 3/2009 | Baum et al. .................... 709/231 |
| 2009/0119735 | A1 | 5/2009 | Dounaevski et al. |
| 2009/0161682 | A1* | 6/2009 | Johnson et al. ............... 370/401 |
| 2009/0247006 | A1* | 10/2009 | Thompson .................... 439/527 |
| 2010/0146564 | A1* | 6/2010 | Halik et al. ..................... 725/78 |

(Continued)

OTHER PUBLICATIONS

Non-Final Office Action for U.S. Appl. No. 13/109,529 mailed Dec. 6, 2012.

*Primary Examiner* — John Pezzlo
(74) *Attorney, Agent, or Firm* — Sutherland Asbill & Brennan LLP

(57) ABSTRACT

Systems, methods, and apparatus for providing broadband communication are described. A service gateway may be situated outside of one or more households. The service gateway may include a termination component and a broadband modem. The termination component may be configured to connect to a source of a broadband data signal and receive the signal from the source. The broadband modem may be configured to receive the signal from the termination component and output at least a portion of the signal for receipt by a remote device situated within a household. Additionally, the service gateway may optionally include a router in communication with the broadband modem. The router may be configured to function as an intermediary between the modem and the remote device.

32 Claims, 5 Drawing Sheets

U.S. PATENT DOCUMENTS

2010/0154016 A1* 6/2010 Li et al. .................. 725/111
2010/0246582 A1   9/2010 Salinger et al.
2010/0322085 A1* 12/2010 Kalbag .................... 370/249
2011/0001833 A1*  1/2011 Grinkemeyer et al. ....... 348/192
2011/0096762 A1*  4/2011 Basart ..................... 370/338
2011/0107379 A1*  5/2011 Lajoie et al. ............... 725/87
2012/0110631 A1   5/2012 Rakib
2012/0198510 A1   8/2012 Stoneback et al.
2012/0204216 A1*  8/2012 Connelly et al. ........... 725/106

* cited by examiner

SERVICE GATEWAYS FOR PROVIDING BROADBAND COMMUNICATION

CROSS-REFERENCE TO RELATED APPLICATION

The present application claims benefit of U.S. Provisional Application No. 61/345,245, filed May 17, 2010 and entitled "Systems and Methods for Providing Broadband Communication," the disclosure of which is incorporated by reference herein in its entirety.

FIELD OF THE INVENTION

Aspects of the invention relate generally to broadband communication, and more particularly, to service gateways that facilitate the provision of broadband communication.

BACKGROUND OF THE INVENTION

Broadband service providers, such as cable service providers and satellite service providers, typically communicate one or more broadband signals and/or other signals to any number of households. These communicated signals may provide any number of services, such as television service, telephone service, Internet service, etc. In conventional systems, a signal is communicated from outside of a household to a gateway device situated within the household. For example, in a conventional cable system, a cable drop or line may be extended into a household, and signals communicated via the drop may be received and processed by one or more gateway devices, such as a cable modem, situated within the household.

However, the location or situation of gateway devices inside of households may make it difficult for the service provider to respond to and/or correct technical service issues. With gateway devices inside of a household, the service provider will often need to have a technician enter the household in order to address any equipment issues. Additionally, it may be difficult for the service provider to disconnect service without sending a technician to the household. Furthermore, when gateway devices are situated inside of a household, a customer of the service provider may remove a gateway device belonging to the service provider when the customer moves.

Therefore, improved service gateways that facilitate the provision of broadband communication are desirable. Additionally, improved service gateways that are situated outside of one or more households serviced by the gateways are desirable.

BRIEF DESCRIPTION OF THE INVENTION

Some or all of the above needs and/or problems may be addressed by certain embodiments of the invention. Embodiments of the invention may include service gateways and associated methods for providing broadband communication. In one embodiment, a service gateway may be provided. The service gateway may be situated outside of one or more households, and the service gateway may include a termination component, a broadband modem, and a router. The termination component may be configured to connect to a source of a broadband data signal and receive the signal from the source. The broadband modem may be configured to receive the signal from the termination component. The router may be in communication with the broadband modem and configured to communicate at least a portion of the signal to one or more remote devices situated within the one or more respective households via a respective local area network.

In accordance with another embodiment of the invention, a service gateway may be provided. The service gateway may be situated outside of a household, and the service gateway may include a termination component and a broadband modem. The termination component may be configured to connect to a source of a broadband data signal and receive the signal from the source. The broadband modem may be configured to receive the signal from the termination component and provide at least a portion of the signal to a remote device situated within the household via a network.

In accordance with another embodiment of the invention, a service gateway may be provided. The service gateway may be situated outside of a household, and the service gateway may include a termination component, a broadband modem, and a router. The termination component may be configured to connect to a source of a broadband data signal and receive the signal from the source. The broadband modem may be configured to receive the signal from the termination component. The router may be in communication with the broadband modem and configured to provide at least a portion of the signal to a remote device situated within the household via a local area network.

In accordance with yet another embodiment of the invention, a method for providing a broadband communication is described. A service gateway may be provided, and the service gateway may be situated outside of a household. Additionally, the service gateway may include a termination component and a broadband modem in communication with the termination component. A broadband signal may be received by the termination component from a source. At least a portion of the signal may be output by the modem for communication via a network to a remote device situated within the household.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
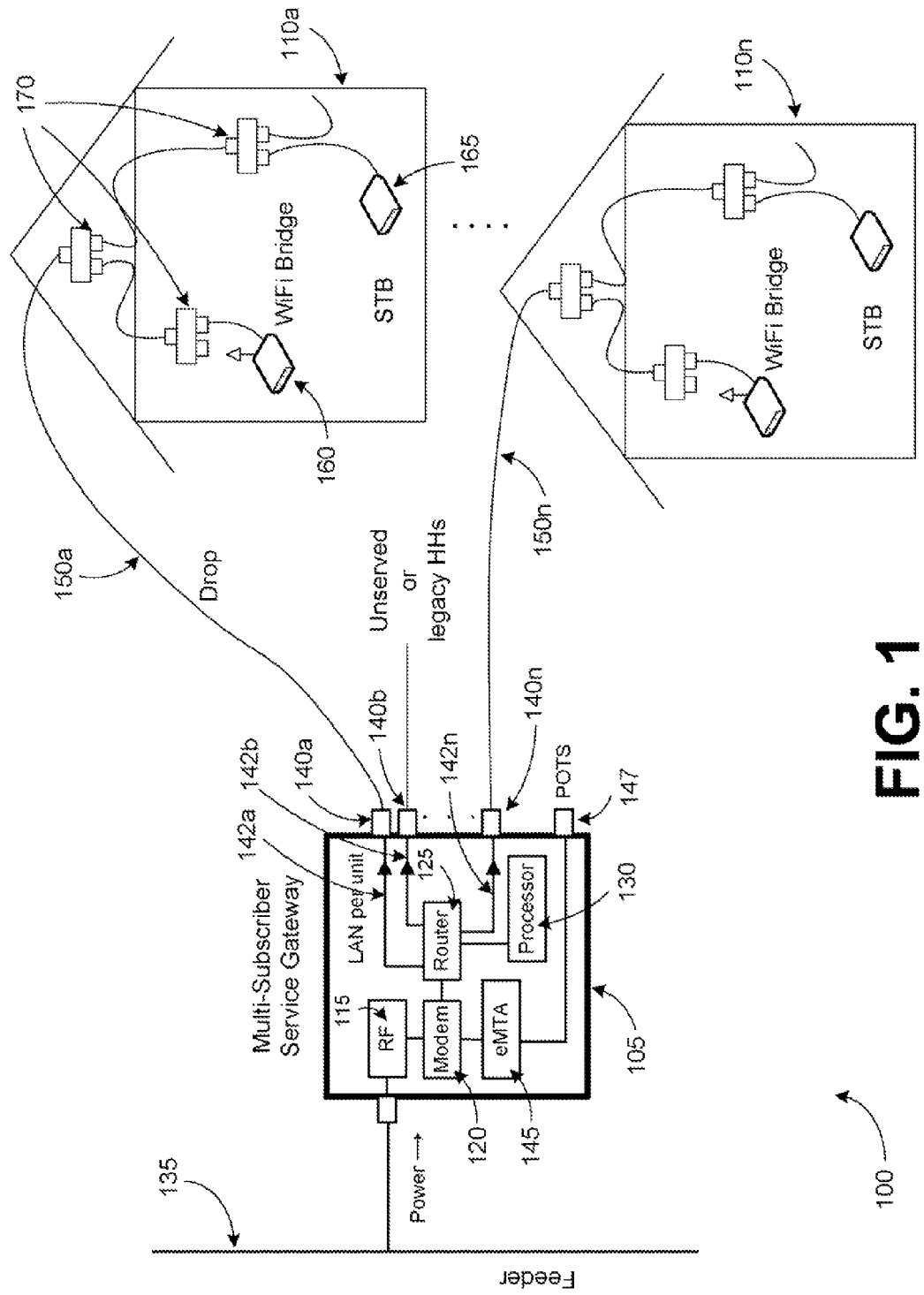
FIG. 1 illustrates a block diagram of a first example system for providing broadband communication, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may include systems, methods, and apparatus for providing broadband communication. In certain embodiments, a service gateway that is configured to provide broadband communications may be situated outside of one or more households that are serviced by the gateway. In this regard, an outside hardened solution for providing broadband communication may be provided. These outside service gateways may be easily accessed by a service provider. The service gateway may include a termination component that is configured to connect to a source of a broadband data signal and receive the signal from the source. For example, the service gateway may include a termination component that is connected to a cable network. The service gateway may additionally include a broadband modem, such as a cable modem, a Digital Subscriber Line ("DSL") modem, or a passive optical network ("PON") modem, that is in communication with the termination component and configured to receive the broadband data signal from the termination component. The broadband modem may then output at least a portion of the data signal for receipt by one or more devices situated with one or more households, such as a bridging device, Ethernet device, router, or set-top box. As desired, the modem may be a multi-channel modem that facilitates the provision of broadband communication to a plurality of households and/or to a plurality of units within a multi-dwelling structure, such as an apartment complex or a condominium structure. For example, the modem may be a multi-channel Digital Over Cable Service Interface Specification ("DOCSIS") modem. Additionally, in certain embodiments, the service gateway may include a router that is in communication with the broadband modem and configured to route data between the modem and the one or more remote devices situated within the household(s).

In certain embodiments, the service gateway may be powered via the termination component and/or the source of the broadband data signal. For example, the service gateway may receive power via a cable line that is connected to the termination component and that forms a source of a broadband signal. In other embodiments, the service gateway may be powered via a power bridge that is connected to an external power source, such as a power source situated within a household or multi-dwelling unit. In these embodiments, if a loss of power via the power bridge is detected, the modem may be configured to provide a lifeline embedded Multimedia Terminal Adapter ("eMTA") service to the one or more households.

For purposes of this disclosure, the term "household" refers to any residential unit or business establishment that may be provided with broadband communication service, including but not limited to, houses, apartment units, condominium units, small businesses, etc. A service gateway in accordance with an embodiment of the invention may be situated outside of one or more households. For example, a service gateway may be situated relatively close to a street within a residential neighborhood or within a utility closet or other service area of an apartment complex.

Embodiments of the invention may include a wide variety of suitable service gateways that are situated outside of one or more households. Although certain example service gateways are described herein, the invention should not be limited to the described service gateways. The described service gateways are provided by way of example only and should not be construed as limiting.

A first example service gateway arrangement or system 100 will now be described illustratively with respect to FIG. 1. The system 100 may include a service gateway 105 that is configured to provide service to one or more households 110a-n. The service gateway 105 may include a termination component 115, a modem 120, and a router 125. As desired, certain components of the service gateway 105, such as the modem 120 and the router 125, may include one or more processing devices that may be configured for processing a received broadband signal and providing the broadband signal to the one or more households 110a-n. Additionally, as desired, the service gateway 105 may include a processor 130 or processing component that controls the general operations of the service gateway 105 and facilitates control of one or more of the other components of the gateway 105. As desired, a processing device or processing component may be configured to access and read associated computer-readable media having stored thereon data and/or computer-executable instructions for implementing the various methods of the invention.

The termination component 115 may be configured to connect to a source of a broadband data signal and receive the signal from the source. For example, the termination component 115 may be configured to connect to a feeder 135 of a broadband data signal, such as a feeder line provided by a cable company or other service provider. In one example embodiment, the service gateway 105 may be situated at and/or within a cable junction box, and the feeder 135 may connect to the termination component 115 at the junction box. A wide variety of suitable termination components 115 may be utilized as desired in various embodiments of the invention, such as a radio frequency ("RF") termination component or an RF coaxial termination component.

Once a broadband data signal is received by the termination component 115, the termination component may provide at least a portion of the received signal to the modem 120. For example, one or more components of the broadband data signal that carry modulated digital data may be provided to the modem 120. As explained in greater detail below, in certain embodiments, one or more analog components of the signal and/or unencrypted digital components of the signal (e.g., clear quadrature amplitude modulation ("QAM") components) may be provided from the termination component 115 to one or more ports 140a-n for provision to the one or more households 110a-n.

Additionally, in certain embodiments of the invention, the termination component 115 may receive a power signal from the feeder 135 or other source. For example, a power signal may be received via a coaxial cable that connects the service gateway 105 to the feeder 135. As desired, the received power signal may be provided by the termination component 115 to one or more other components of the gateway 105, such as the modem 120 and/or the router 125. In this regard, components of the service gateway 105 may be powered by the source of the broadband data signal. Alternatively, the service gateway 105 may be powered via a power bridge connected to a household. For example, the service gateway 105 may be powered via a power bridge connected to a power outlet or other power source at an apartment complex. Examples of the powering of a service gateway are described in greater detail below with reference to FIGS. 2-4.

The modem 120 may be any suitable device that is configured to receive at least a portion of the broadband data signal from the termination component 115 and demodulate the received signal. Additionally, the modem may be configured to selectively output the broadband data signal and/or portions of the broadband data signal for receipt by the one or more households 110a-n. As desired, the modem 120 may be capable of providing a wide variety of services to a household, such as television service, Internet service, Voice over Internet Protocol ("VoIP") telephone service, home monitoring services, etc. In certain embodiments, the modem 120 may divide and/or filter the received signal into one or more frequency bands associated with different services. Additionally, as desired, the modem 120 may selectively decrypt the received signal.

A wide variety of different types of broadband modems may be utilized as desired in various embodiments of the invention, including but not limited to, cable modems, DSL modems, or PON modems. In certain embodiments, the modem 120 may be a Digital Over Cable Service Interface Specification ("DOCSIS") modem that operates utilizing a DOCSIS telecommunications standard. Additionally, as desired, the modem 120 may be a multi-channel modem that is capable of providing a signal to multiple households. The modem 120 may include any number of channels as desired in various embodiments, such as four channels, eight channels, etc. Additionally, each of the households 110a-n and/or devices situated within the household (e.g., bridging devices, set-top boxes, etc.) may be individually addressable by the modem 120. In other words, the modem 120 may individually control the provision of services to individual households 110a-n and/or individually communicate with one or more remote devices situated within the households 110a-n. For example, the modem 120 may be configured to individually communicate with set-top boxes, routers, bridging devices, and/or other devices situated within the one or more households 110a-n. In this regard, the modem 120 may selectively provide portions of the broadband signal to the one or more households 110a-n.

Additionally, in certain embodiments, the modem 120 or another processing device associated with the service gateway 105 may control the provision of signals that are not processed by the modem 120, such as analog signals, clear QAM signals, etc., to the one or more households 110a-n. For example, the modem 120 may control the positioning and/or actuation of one or more switches that facilitate the communication of an analog signal from the termination component 115 to the ports 140a-n. In this regard, if a household 110 is not authorized to receive the analog signal, then the modem 120 may prevent the signal from being provided to the household 110. Accordingly, services (e.g., analog services, clear QAM services, digital services, etc.) may be selectively activated and deactivated for the households 110a-n by the modem 120. In certain embodiments, control signals and/or configuration files may be uploaded or otherwise communicated to the modem 120 from the source, and the modem 120 may utilize the received information to selectively control the provision of services to the one or more households 110a-n. Accordingly, it is not necessary to dispatch a service technician to a household in order to activate or deactivate services.

With continued reference to FIG. 1, the router 125 may receive the broadband data signal (or a portion thereof) from the modem 120, and the router 125 may output the broadband data signal for receipt by one or more remote devices situated within the one or more households 110a-n. The router 125 may be a specialized computer or computing component that facilitates the receipt of information from the modem 120 and the forwarding of received information to the households 110a-n. In certain embodiments, the router 125 may receive, from the modem 120 for a household 110, only a portion of the broadband data signal that the household 110, a remote device situated within the household 110, and/or a user in the household 110 is authorized to receive. In other embodiments, the router 125 may receive one or more control signals from the modem 120, and the router 125 may selectively output portions of the broadband data signal to the one or more households 110a-n based upon the control signals.

A wide variety of suitable routers may be utilized as desired in various embodiments of the invention. Additionally, as desired, the router 125 may be a router that includes a multi-channel interface and/or multiple ports that facilitate communication with multiple households 110a-n. The router 125 may include any number of interfaces and/or ports as desired in various embodiments, such as four interfaces/ports, eight interfaces/ports, etc. In certain embodiments, the router 125 may be a router that includes one or more Multimedia over Coax Alliance ("MoCA") interfaces, although other interfaces and/or standards may be utilized. Utilizing MoCA interfaces, one or more MoCA signals may be output by the router 125 for communication to the households 110a-n. A MoCA signal may be a signal that is allowed to be communicated to a household 110; however, the MoCA signal may be filtered by the router 125 and/or any number of suitable MoCA filters or point of entry ("POE") filters in order to prevent leakage of the MoCA signal onto the feeder 135 and/or to the source. In this regard, a home network formed between the router 125 and a household 110 may be isolated from the source.

As desired, the router 125 may include a wireless output component. For example, the router 125 may form a wireless access point that facilitates access to broadband communication via any number of wireless devices or Wi-Fi devices. In certain embodiments, devices that are permitted to access certain portions of the broadband signal, such as mobile devices and/or computers associated with a household 110, may be configured to receive a wireless signal from the router 125.

In operation, the router 125 may output a signal for receipt by a household 110 via a local area network ("LAN") that is formed between the router 125 and the household 110. In certain embodiments, a separate LAN may be provided for each respective household 110. As illustrated in FIG. 1, any number of LANs 142a-n may be provided for the respective households 110a-n that are serviced by the gateway 105. Each LAN 142a-n may be associated with a corresponding port 140a-n that facilitates output of a broadband signal from the router 125 to the respective household 110a-n. The ports 140a-n may additionally facilitate the communication of analog components, clear QAM components, and/or other components of the broadband signal to the households 110a-n. With reference to FIG. 1, a first port 140a may facilitate the creation of a first LAN 142a between the service gateway 105 and a first household 110a. Similarly, an nth port 140n may facilitate the creation of an nth LAN 142n between the service gateway 105 and an nth household 110n. Any number of households may be served in this manner. Additionally, as desired, certain ports may not be connected to a household, thereby leaving a household without service and/or providing resources to expand the services provided by the gateway device 105. Moreover, in certain embodiments, the service gateway 105 may provide conventional or legacy services to any number of households. For example, legacy services that bypass the functionality of the modem 120 (e.g., television service, etc.) may be provided to one or more households.

With continued reference to FIG. 1, the service gateway 105 may include an embedded Multimedia Terminator Adaptor ("eMTA") 145 in certain embodiments of the invention.

For example, in embodiments in which the modem 120 is a cable modem, an eMTA 145 may be provided in order to extend the functionality of the modem 120 to provide telephone service to the one or more households 110a-n. As desired, the eMTA 145 may be a multi-line eMTA. The eMTA 145 may facilitate the provision of Voice over Internet Protocol ("VoIP") telephony to the one or more households 110a-n. VoIP services may be provided to the households 110a-n via the respective LANs 142a-n and/or via any number of suitable plain old telephone service ("POTS") ports 147 and/or connections between the service gateway 105 and the households 110a-n. With other types of modems (e.g., DSL modems, PON modems, etc.), other suitable devices and/or components that are similar to the eMTA 145 may be provided in the service gateway 105 to facilitate the provision of telephone service to the households 110a-n.

In certain embodiments, one or more processors 130 or control units may be incorporated into the service gateway 105. As desired, at least one processor 130 may be incorporated into another component of the service gateway 105. For example, the processor 130 may be incorporated into the modem 120. The at least one processor 130 may be any suitable processor-driven device that facilitates control of the general operation of the service gateway 105. Examples of suitable processor-driven devices include, but are not limited to, a personal computer, a digital assistant, a personal digital assistant, a digital tablet, an Internet appliance, an application specific circuit, a microcontroller, a minicomputer, or any other processor-based device. As desired, the processor 130 may access and execute computer-readable or computer-implemented instructions. The execution of the computer-readable instructions by the processor 130 may form a special purpose computer or other particular machine that is operable to control the operation of the service gateway 105 and/or the provision of services to the households 110a-n. Additionally, in certain embodiments of the invention, the operations and/or control of the service gateway 105 may be distributed among several processing components.

As desired, the processor 130 may include any number of computing processors, memory devices (e.g., caches, read only memory devices, random access memory devices, magnetic storage devices, etc.), input/output ("I/O") interface(s), and network interface(s). The memory devices may store data, executable instructions, and/or various program modules utilized by the processor 130, for example, data files, an operating system ("OS"), and a service application. The data files may include any suitable data that facilitates the operation of the service gateway 105 and/or the provision of broadband communication and/or other services to the households 110a-n. For example, the data files may include, but are not limited to, customer profiles for the households 110a-n, customer profiles for various individuals and/or users within one or more households 110a-n, information associated with activated or enabled services, usage information, monitoring information, etc. The OS may be a suitable software module that controls the general operation of the processor 130. The OS may also facilitate the execution of other software modules, for example, the service application.

The service application or service module may be utilized to control the provision of services to the households 110a-n. For example, the service application may identify one or more services that should be provided to a household 110 (e.g., telephone service, Internet service, television service, premium television service, certain channels, etc.) or to one or more devices within the household 110. A wide variety of information may be utilized as desired to determine which services should be provided, including but not limited to, stored customer profile information, authorization information received from the source, and/or authorization information (e.g., identifier, password, credentials, etc.) received from a device situated within the household 110. Once the service application has identified one or more services that should be provided to the household 110, the service application may control the communication of portions of the broadband signal to the household 110 via the modem 120 and/or router 125. In certain embodiments of the invention, each household and/or devices situated within the household may be individually addressable, thereby facilitating control over services and/or broadband communications that are provided by the service gateway 105. In other words, the modem 120 and/or router may individually control the provision of services to individual households 110a-n and/or individually communicate with one or more remote devices situated within the households 110a-n. For example, the modem 120 and/or router 125 may be configured to individually communicate with set-top boxes, routers, bridging devices, and/or other devices situated within the one or more households 110a-n.

The one or more I/O interfaces may facilitate communication between the processor 130 and one or more input/output devices, for example, one or more user interface devices, such as a display, keypad, control panel, touch screen display, etc., that facilitate user interaction with the processor 130. The one or more network interfaces may facilitate connection of the processor 130 to one or more suitable networks, for example, a local area network that facilitates communication between various components of the service gateway 105.

With continued reference to FIG. 1, any number of households 110a-n, such as homes, apartments, etc., may be serviced by the service gateway 105. A drop 150 may be utilized to carry a signal from the service gateway 105 to a household 110. As shown a first drop 150a may connect the service gateway 105 to a first household 110a. Similarly, an nth drop 150n may connect the service gateway 105 to an nth household 110n. Any number of drops may be utilized as desired in various embodiments. Additionally, a wide variety of different types of drops may be utilized as desired. In certain embodiments, a respective coaxial cable drop may be provided to each household 110a-n.

Once a drop 150 reaches a household 110, connections may be provided to any number of devices situated within the household 110. For example, with reference to FIG. 1, a first drop 150a may be provided to the first household 110a, and connections may be provided to any number of remote devices 160, 165 situated within the first household 110a. The remote devices 160, 165 may include any suitable devices that are configured to receive broadband communications that are output by the service gateway 105, including but not limited to, a Wi-Fi bridging device, an Ethernet bridging device, another network bridging device, an Ethernet router, another suitable router, a set-top box, a television, a VoIP telephone, an alarm system, etc. As shown in FIG. 1, connections may be provided to a Wi-Fi bridging device 160 and a set-top box 165. As desired, any number of suitable splitters 170 or bridge transformers may be provided within the household 110 to facilitate the provision of a broadband signal to various remote devices.

According to an aspect of the invention, the service gateway 105 may provide an outside hardened solution for providing broadband services to one or more households 110a-n. In other words, certain functionality that is normally situated within a household 110, such as the functionality of a broadband modem 120 and/or router 125, may be moved outside of the household 110. For example, functionality may be moved to a cable tap that is situated outside of one or more households 110a-n. As a result, relatively faster installation and/or activation of services for a household 110 may be facilitated. For example, one or more services may be activated for a particular household 110 by reconfiguring the modem 120, router 125, and/or processor 130 to output different portions of a received broadband signal to the household 110.

Additionally, the requirement of positioning certain equipment, such as a modem 120 and/or router 125, inside of the household 110 is eliminated. Accordingly, the activation of services by a customer may be simplified because the customer does not have to install and/or initialize this equipment. Additionally, a technician may access and/or service the equipment without entering the household 110, thereby leading to relatively more efficient service calls. Further, by positioning equipment outside of the household 110, the likelihood that a customer will damage and/or remove service provider equipment (e.g., take a modem during a move) may be reduced. Additionally, in certain embodiments, the cost of the equipment may be split among several households 110a-n. Accordingly, equipment upgrade costs may be split among several households 110a-n. Additionally, as desired, the equipment may be scalable in order to facilitate the provision of services to any number of households.

Figure 2:
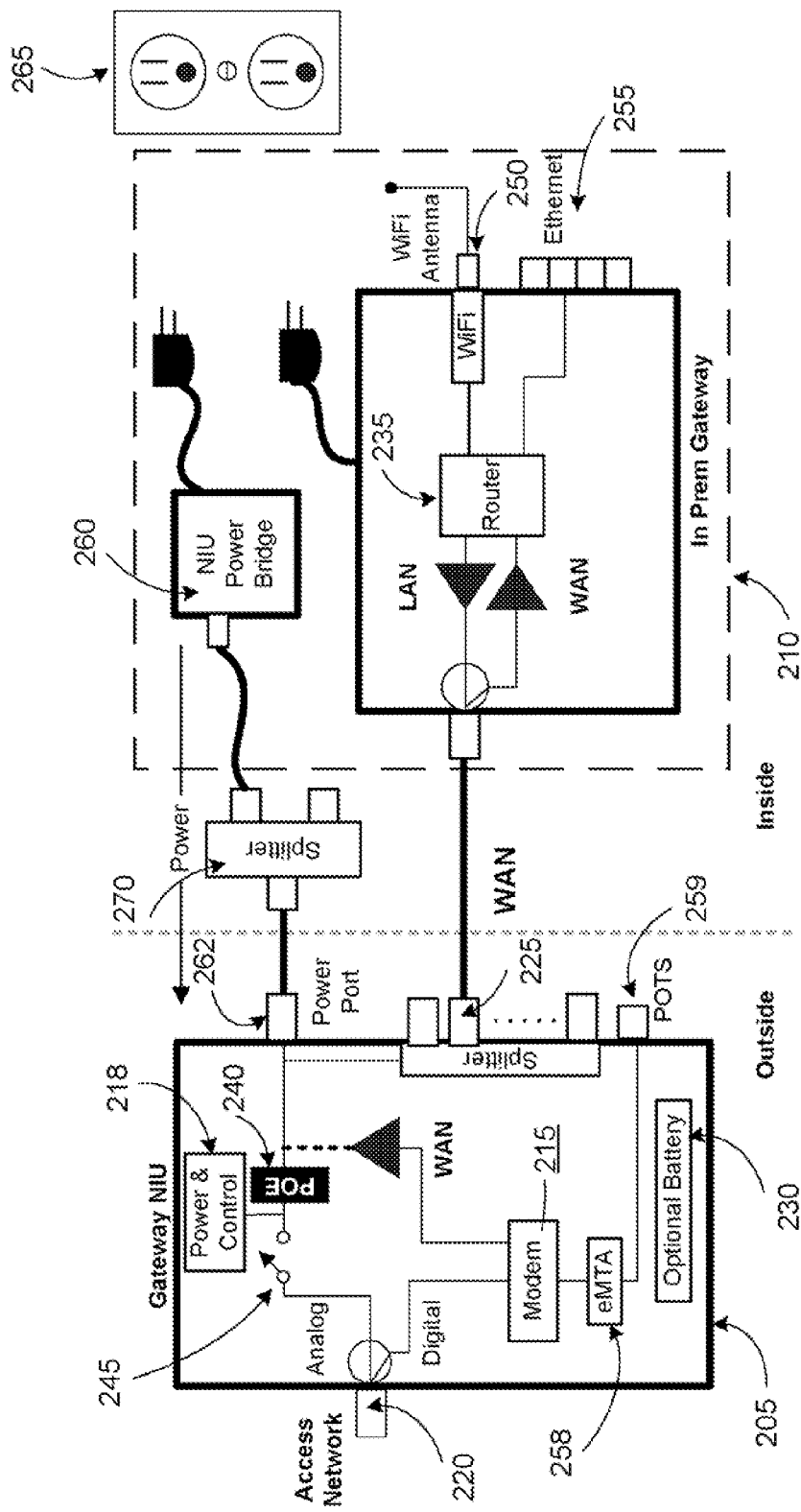
FIG. 2 illustrates a block diagram of a second example system for providing broadband communication, according to an example embodiment of the invention.

FIG. 2 illustrates a block diagram of a second example system 200 for providing broadband communication, according to an example embodiment of the invention. Similar to the system 100 of FIG. 1, the second system 200 includes a service gateway 205 that is situated outside of a household 210. The service gateway 205 may include a modem 215 that is configured to receive a broadband data signal and provide at least a portion of the received broadband data signal to the household 210. As desired, the modem 215 may include one or more processing devices that may be configured for processing a received broadband signal and providing the broadband signal to the household 210. Additionally, the processing devices may control the general operations of the service gateway 205 and/or facilitate control of one or more of the other components of the gateway 205. Additionally or alternatively, additional processing devices and/or control units, such as the controller 218 illustrated in FIG. 2, may be included. A processing device or processing component may be configured to access and read associated computer-readable media having stored thereon data and/or computer-executable instructions for implementing the various methods of the invention. The service gateway 205 of FIG. 2 is described as providing service to a single household 210; however, the functionality of the gateway 205 may be extended in order to provide service to multiple households.

With reference to FIG. 2, the service gateway 205 may include a termination component 220 that is configured to connect to a source of a broadband data signal and receive the signal from the source. The termination component 220 may be similar to the termination component 115 described above with reference to FIG. 1. For example, the termination component 220 may be a suitable RF coaxial termination component configured to connect to a feeder of a broadband data signal. Once a broadband data signal is received by the termination component 220, the termination component 220 may provide at least a portion of the received signal to the modem 215. For example, one or more components of the broadband data signal that carry modulated digital data may be provided to the modem 215. Additionally, as desired, one or more analog components of the signal and/or unencrypted digital components of the signal (e.g., clear QAM components) may be provided from the termination component 220 to a port 225 for provision to the households 210. As explained in greater detail below, a processing component associated with the gateway 205, such as the modem 215 and/or the controller 218, may control the provision of certain signal components (e.g., analog components, QAM components, etc.) from the termination component 220 to the port 225.

The modem 215 may be any suitable device that is configured to receive at least a portion of the broadband data signal from the termination component 220, demodulate the received signal, and selectively output the signal and/or portions thereof for receipt by the household 210. For example, the modem 215 may be similar to the modem 120 described above with reference to FIG. 1. As desired, the modem 215 may be capable of providing a wide variety of services to the household 210, such as television service, Internet service; Voice over Internet Protocol ("VoIP") telephone service, home monitoring services, etc. In certain embodiments, the modem 215 may be a Digital Over Cable Service Interface Specification ("DOCSIS") modem that operates utilizing a DOCSIS telecommunications standard. Additionally, as desired, the modem 215 may individual address the household 210 and/or devices and/or users situated within the household 210, such as a VoIP telephone, a security system, a set-top box, a router, a computer, a user associated with a set-top box, computer, or other device, etc. In this regard, the modem 215 may control the portion of the broadband data signal that is output for receipt by the household 210 and/or devices situated within the household 210. For example, if VoIP services and Internet services have been activated for a household 210, then portions of the broadband data signal associated with these services may be output for communication to the household 210. As another example, portions of the broadband data signal associated with certain television channels may be output for particular users within the household 210 based upon user identification and/or access credentials.

In certain embodiments, the modem 215 may divide and/or filter the received signal into one or more frequency bands associated with different services. For example, a digital television signal, telephone signal, etc. may be divided or filtered from a received broadband signal. In this regard, the modem 215 may control the portions of the broadband signal that are output for receipt by the household 210 based at least in part on controlling the frequency bands that are output. Additionally, as explained in greater detail below, the modem 215 may modify the portions of a signal that are output during an identified power loss event. For example, if a supply of power to the service gateway 205 is disconnected or fails, then the modem 215 may enter a relatively low power consumption mode, such as a power mode that operates off of one or more batteries 230 or a power mode that receives power from the termination component 220 (e.g., a power mode that receives power from a cable feeder, etc.). While operating in the relatively low power consumption mode, the modem 215 may discontinue the output of certain portions of or frequency band components of the broadband signal (e.g., television components, etc.) while maintaining the output of other portions of the signal, such as a component that provides emergency telephone service. In this regard, certain services, such as emergency telephone service, may be provided to the household 210 during a power loss or reduced power event.

In operation, the modem 215 may output one or more signals and/or components of the broadband data signal for receipt by one or more remote or household devices situated within the household 210. For example, the modem 215 may output a signal that is communicated via a suitable port 225 for receipt by a household device. The port 225 may be similar to the ports 140a-n described above with reference to FIG. 1, and the port 225 may facilitate the output of analog and/or digital data. A wide variety of suitable household devices may be configured to receive a signal output by the modem 215. As illustrated in FIG. 2, a suitable router 235 situated within the household 210 may be configured to receive a signal output by the modem 215 and provided via the port 225. In certain embodiments, a wide area network ("WAN") may be formed between the modem 215 and the router 235. As desired, the WAN may include a MoCA transport layer, although other transport layers and/or communications standards may be utilized. Additionally, the MoCA signal may be filtered by the modem 215 and/or any number of suitable MoCA filters or point of entry ("POE") filters 240 in order to prevent leakage of the MoCA signal back through the termination component 220. In this regard, a network formed between the modem 215 and router 235 or other household device may be isolated from the source.

In certain embodiments, the modem 215, the controller 218, or another processing device associated with the service gateway 205 may control the provision of signals that are not processed by the modem 215 (e.g., analog signals, clear QAM signals, etc.), to the household 210. For example, the modem 215 or controller may control the positioning and/or actuation of one or more switches 245 that facilitate the communication of an analog signal from the termination component 220 to the port 225. In certain embodiments, the positioning of the switch(es) 245 may be controlled based upon a configuration of the modem 215 or controller 218, such as a configuration that is communicated to the modem 215 by a source of the broadband signal. In this regard, if the household 210 is not authorized to receive the analog signal, then the modem 215 or controller 218 may prevent the signal from being provided to the household 210. Accordingly, it is not necessary to dispatch a service technician to a household in order to activate or deactivate services.

The modem 215, controller 218, and/or other processing devices included in the service gateway 205 may be suitable processor-driven devices, such as devices that include a computing component, a personal computer, a digital assistant, a personal digital assistant, a digital tablet, an Internet appliance, an application specific circuit, a microcontroller, a minicomputer, or other processor-driven components. As desired, one or more processors may be provided that access and execute computer-readable or computer-implemented instructions. The execution of the computer-readable instructions may form a special purpose computer or other particular machine that is operable to control the operation of the service gateway 205 and/or the provision of services to the household 210. Additionally, as desired, the operations and/or control of the service gateway 205 may be distributed among several processing components.

As desired, a processing device included in the service gateway 205 may include any number of computing processors, memory devices (e.g., caches, read only memory devices, random access memory devices, magnetic storage devices, etc.), input/output ("I/O") interface(s), and network interface(s). The I/O interfaces and network interfaces may be similar to those described above with reference to FIG. 1. The memory devices may store data, executable instructions, and/or various program modules utilized by the one or more processors, for example, data files, an operating system ("OS"), and a service application. The data files may include any suitable data that facilitates the operation of the service gateway 205 and/or the provision of broadband communication and/or other services to the household 210. For example, the data files may include, but are not limited to, customer profiles for the household 210, customer profiles for various individuals and/or users within the household 210, information associated with activated or enabled services, usage information, monitoring information, etc. The OS may be a suitable software module that controls the general operation of the processing device. The OS may also facilitate the execution of other software modules, for example, the service application.

The service application or service module may be utilized to control the provision of services to the household 210. For example, the service application may identify one or more services that should be provided to the household 210 (e.g., telephone service, Internet service, television service, premium television service, certain channels, etc.) or to one or more devices within the household 210. A wide variety of information may be utilized as desired to determine which services should be provided, including but not limited to, stored customer profile information, authorization information received from the source, and/or authorization information (e.g., identifier, password, credentials, etc.) received from a device situated within the household 210. Once the service application has identified one or more services that should be provided to the household 210, the service application may control the communication of portions of the broadband signal to the household 210.

Once received, the router 235 or other household device may communicate portions of the received signal to other household devices. For example, the router 235 may include a wireless component, such as a WiFi antenna 250 and/or a wireless transceiver, that is configured to output portions of the received signal for receipt by wireless devices. As another example, the router 235 may utilize one or more Ethernet output ports 255 or other suitable output ports to communicate portions of the signal to other household devices, such as a computer, a set-top box, etc. As desired, the router 235 may be utilized to form a local area network ("LAN") within the household 210, and the router may distribute portions of the broadband signal to other devices via the LAN.

With continued reference to FIG. 2, in certain embodiments, the service gateway 205 may include an embedded Multimedia Terminator Adaptor ("eMTA") 258. For example, an eMTA 258 may be provided in order to extend the functionality of the modem 215 to provide telephone service to the household 210. The eMTA 258 may facilitate the provision of Voice over Internet Protocol ("VoIP") telephony to the household 210. VoIP services may be provided to the household 210 via the WAN connection formed between the modem 215 and the household 210 and/or a suitable plain old telephone service ("POTS") port 259 formed between the service gateway 205 and the household 210. As an alternative to an eMTA component, other suitable devices and/or components that are similar to the eMTA may be provided in the service gateway 205 to facilitate the provision of telephone service to the household 210.

In certain embodiments, the service gateway 205 may be powered by a suitable power bridge 260 that receives power from the household 210. For example, a power bridge 260 may be configured to receive power from the household 210 and provide the power to a suitable power port 262 associated with the service gateway 205, and the provided power may be utilized by the gateway 205 to power one or more components of the gateway 205, such as the modem 215. In one example embodiment, the power bridge 260 may be plugged into or otherwise connected to a suitable power outlet 265 or other power source situated within or otherwise associated with the household 210. In this regard, the power bridge 260 may receive a power signal from the household 210 that may be provided to the service gateway 205. Additionally, as desired, a specialized splitter 270 or other suitable device may be utilized to form a connection between the power bridge 260 and the power port 262. For example, a splitter 270 that permits power to pass through it, such as a direct current ("DC") coupled splitter, may be utilized to form a connection between the power bridge 260 and the power port 262. As an alternative to powering the service gateway 205 utilizing a power bridge 260, a dedicated power line, such as a dedicated home run between the service gateway 205 and the household 210, may be provided.

According to an aspect of the invention, the service gateway 205 may detect a loss of power or a power loss event. For example, if power in the household 210 is lost or the power bridge 260 becomes disconnected, then a loss of power event may be identified. If a loss of power event is identified, the modem 215, controller 218, and/or other components of the service gateway 205 may enter a relatively low power mode. In this mode, the service gateway 205 may alter the services that are provided to the household 210. For example, the service gateway 205 may provide an emergency telephone service to the household 210; however, the gateway 205 may not provide a telephone service or Internet service to the household 210. In one example embodiment, the modem 215 may limit one or more bands of frequency signals that are provided to the household 210 in order to provide only certain services to the household 210. In other words, the modem 215 may utilize frequency modulation to control the services output by the service gateway 205 for the household 210. During the relatively low power mode, the modem 215 and/or other components of the service gateway 205 may be powered by the source of the broadband signal and/or by one or more suitable batteries 230 associated with and/or incorporated into the gateway 205.

With continued reference to FIG. 2, any number of batteries 230 may be incorporated into the service gateway 205. The batteries 230 may be utilized to provide power to one or more components of the gateway 205 in the event of a loss of power or low power event. For example, if a power bridge 260 is disconnected, the batteries 230 may be utilized to provide power to gateway components. Additionally, in certain embodiments, the batteries 230 may be charged by the power bridge 260 or another suitable power source prior to the detection of a loss of power event and/or following the end of a loss of power event.

Figure 3:
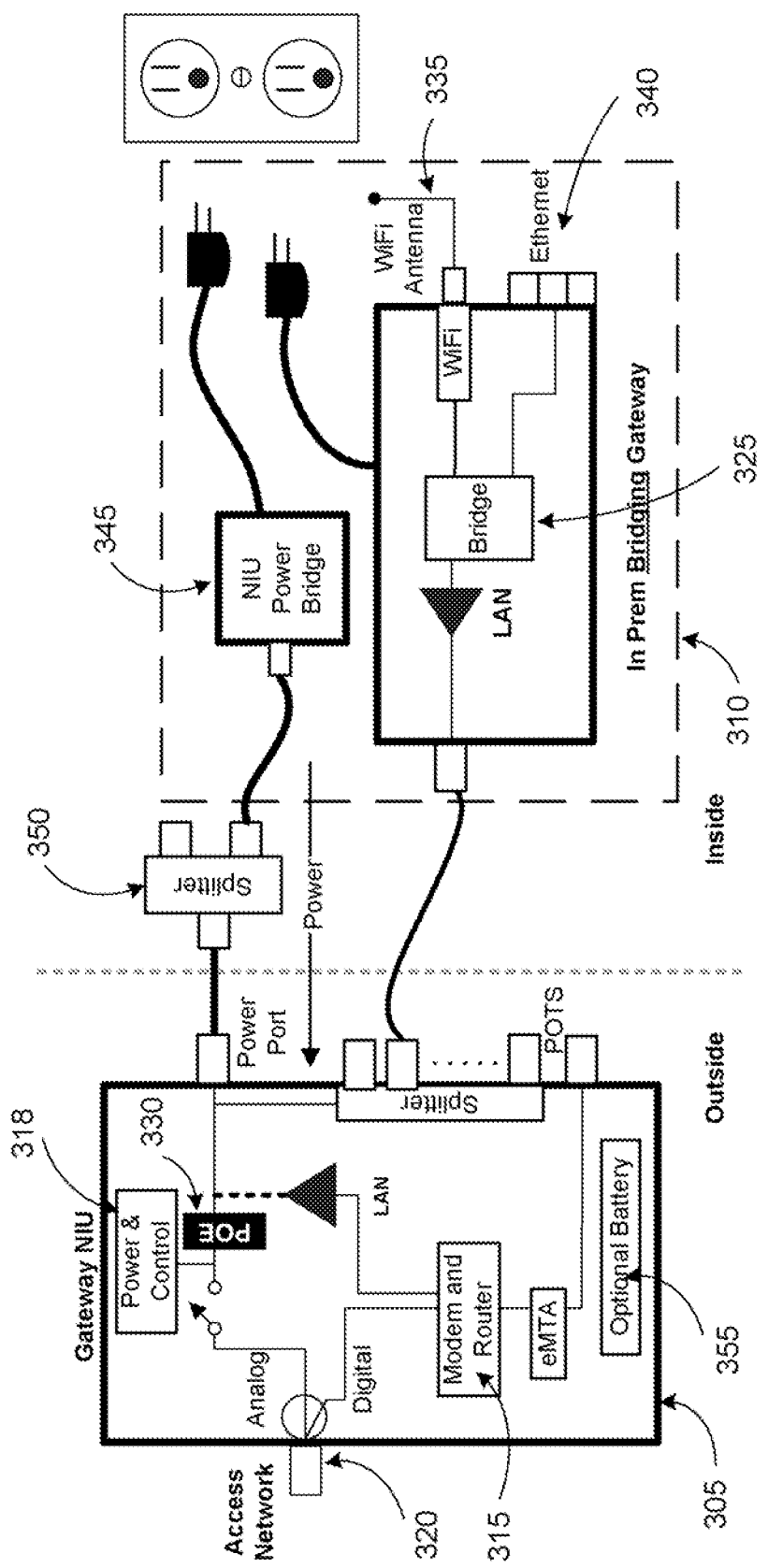
FIG. 3 illustrates a block diagram of a third example system for providing broadband communication, according to an example embodiment of the invention.

FIG. 3 illustrates a block diagram of a third example system 300 for providing broadband communication, according to an example embodiment of the invention. The system 300 of FIG. 3 may be similar to the system 200 illustrated in FIG. 2; however, the system 300 of FIG. 3 may situate both a modem and a router within the service gateway 305. Accordingly, the service gateway 305 may be situated outside of a household 310. The modem/router 315 may be a combination device or two separate devices that are incorporated into or included in the service gateway 305. The modem/router 315 may be configured to receive a broadband data signal and provide at least a portion of the received broadband data signal to the household 310. As desired, the modem/router 315 may include one or more processing devices that may be configured for processing a received broadband signal and providing at least a portion of the broadband signal to the household 310. In this regard, the services provided to the household 310 may be controlled. Additionally, the processing devices may be utilized to control the general operations of the service gateway 305 and/or facilitate control of one or more of the other components of the gateway 305. Additionally or alternatively, additional processing devices and/or control units, such as a controller 318 may be included. A processing device or processing component (e.g., the modem/router 315, controller 318, etc.) may be configured to access and read associated computer-readable media having stored thereon data and/or computer-executable instructions for implementing the various methods of the invention. The service gateway 305 of FIG. 3 is described as providing service to a single household 310; however, the functionality of the gateway 305 may be extended in order to provide service to multiple households.

The modem/router 315 may include a suitable broadband modem component and a suitable router component. The modem component may be similar to the modem 215 described above with reference to FIG. 2. Accordingly, the modem component may be configured to receive a broadband data signal from a suitable termination component 320 and process the received broadband data signal. Once processed by the modem component, at least a portion of the received signal may be processed by the router component. The router component may be similar to the router 125 described above with reference to FIG. 1. The router component may receive the broadband data signal (or a portion thereof), and the router component may output the broadband data signal for receipt by one or more remote devices situated within the household 310, such as a suitable network bridging device 325, set-top box, etc. In a similar manner as that described above with reference to FIG. 1, the router component may form a local area network with one or more remote household devices. For example, a local area network may be formed between the router component and a network bridging device 325. In certain embodiments, the router component may include a MoCA interface, although other interfaces and/or standards may be utilized. Utilizing a MoCA interface, one or more MoCA signals may be output by the router component for communication to the household 310. A MoCA signal may be a signal that is allowed to be communicated to a household 310; however, the MoCA signal may be filtered by the router component and/or any number of suitable MoCA filters or point of entry ("POE") filters 330 in order to prevent leakage of the MoCA signal through the termination component 320. In this regard, a home network formed between the router component and the household 310 may be isolated from the source.

Any number of suitable household devices may be in communication with the modem/router 315 of the service gateway 305. As shown in FIG. 3, a network bridging device 325 situated within the household 310, such as a Wi-Fi bridging device or other suitable bridging device may be configured to receive a broadband signal from the service gateway 305. The network bridging device 325 may receive a broadband signal and provide the signal to one or more other household devices, such as a set-top box, personal computer, security system, etc. As desired, the network bridging device 325 may include or be in communication with a suitable transceiver component or wireless output component, such as a WiFi antenna 335. Additionally, as desired, the network bridging device 325 may be configured to provide a portion of the broadband signal to any number of Ethernet devices 340 or other suitable devices in communication with the network bridging device 325.

With continued reference to FIG. 3, the service gateway 305 may receive power in a similar manner as that described for the service gateway 205 of FIG. 2. For example, a suitable power bridge 345 may be utilized to provide a power signal to the service gateway 305 via a specialized splitter 350. Additionally, as desired, any number of batteries 355 may be incorporated into and/or in communication with the service gateway 305. In a similar manner as that described above with reference to FIG. 2, the modem/router 315 may identify power loss events and/or reduced power events, and the modem/router 315 may alter the components of the broadband signal that are output for receipt by the household 310 based at least in part upon the identification of a power loss or reduced power event.

Figure 4:
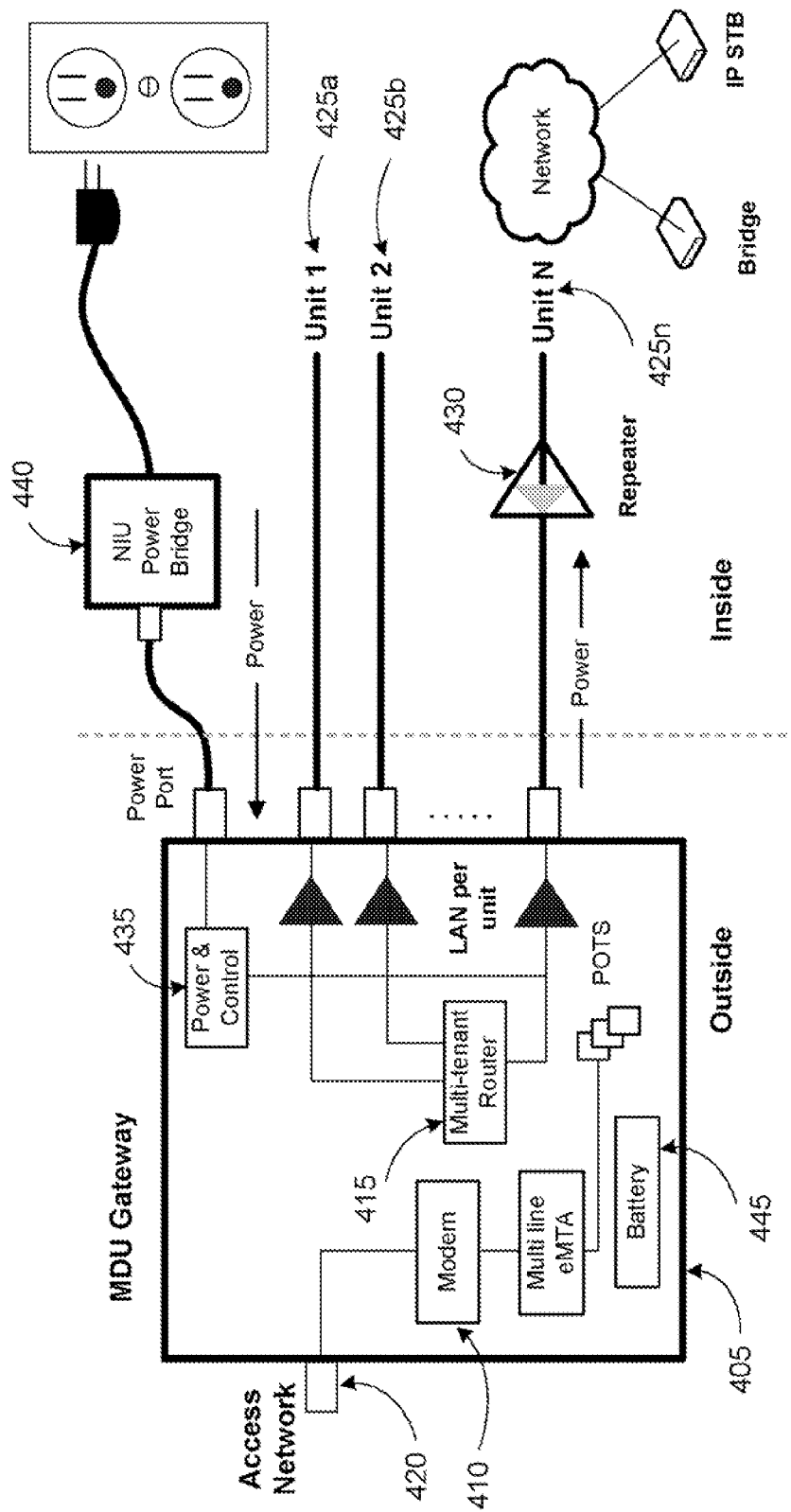
FIG. 4 illustrates a block diagram of a fourth example system for providing broadband communication, according to an example embodiment of the invention.

FIG. 4 illustrates a block diagram of a fourth example system 400 for providing broadband communication, according to an example embodiment of the invention. The system 400 of FIG. 4 may be similar to the systems 100, 200, 300 described above. The system 400 of FIG. 4 may be configured to provide broadband services to a plurality of households or units. For example, the system 400 may be configured for use at an apartment complex or another multi-dwelling unit. The system 400 may include a service gateway 405 that includes a suitable multi-band modem 410 and, as desired, a suitable multi-tenant router 415. The modem 410 and router 415 may be similar to the modem 120 and router 125 illustrated in FIG. 1.

In operation, the modem 410 may be configured to receive a broadband signal from a termination component 420 and to provide at least a portion of the signal to the router 415. The router 415 may be configured to receive the broadband data signal (or a portion thereof) from the modem 410, and the router 415 may selectively output the broadband data signal for receipt by one or more remote devices situated within one or more households 425a-n or units. The router 415 may include any number of channels as desired in various embodiments, such as four channels, eight channels, etc. Additionally, the router 415 may form one or more respective networks, such as a one or more local area networks, with the households 425. As desired, any number of suitable network repeaters 430 or repeating devices (e.g., MoCA repeaters) may be utilized to enhance the signal strength and/or increase the range of the one or more networks. In certain embodiments, the router 415 may be a router that includes one or more MoCA interfaces, although other interfaces and/or standards may be utilized. Utilizing MoCA interfaces, one or more MoCA signals may be output by the router 415 for communication to the households 425a-n. Additionally, the MoCA signal may be filtered by the router 415 and/or any number of suitable MoCA filters or point of entry ("POE") filters in order to prevent leakage of the MoCA signal through the termination component 420.

Once a network has been formed between the router 415 and a household 425a-n, the router 415 may output one or more components of the broadband signal over the network for receipt by any number of remote devices situated within the household 425a-n, such as a suitable network bridging device and/or a set-top box. In this regard, the service gateway 405 may provide one or more broadband services to the households 425a-n. In certain embodiments, each of the households 425a-n and/or devices situated within the households 425a-n may be individually addressable by the modem 410 and/or the router 415.

As desired, the modem 410 and/or router 415 may include one or more processing devices that may be configured for processing a received broadband signal and providing at least a portion of the broadband signal to the households 425a-n. In this regard, the services provided to the households 425a-n may be controlled. Additionally, the processing devices may be utilized to control the general operations of the service gateway 405 and/or facilitate control of one or more of the other components of the gateway 405. Additionally or alternatively, other processing devices and/or control units, such as a controller 435, may be included. A processing device or processing component (e.g., the modem 410, router 415, controller 435, etc.) may be configured to access and read associated computer-readable media having stored thereon data and/or computer-executable instructions for implementing the various methods of the invention. The processing performed by the various processing devices may be similar to the processing described above with reference to FIGS. 1-3.

With continued reference to FIG. 4, the service gateway 405 may receive power in a similar manner as that described for the service gateways 205, 305 of FIGS. 2 and 3. For example, a suitable power bridge 440 may be utilized to provide a power signal to the service gateway 405. For example, a power bridge 440 may be configured to receive power from a power source within a multi-dwelling unit (e.g., a power source within a common utilities area, etc.) and to provide power to the gateway 405. Additionally, as desired, any number of batteries 445 may be incorporated into and/or in communication with the service gateway 405. In a similar manner as that described above with reference to FIG. 2, the modem 410, router 415, and/or controller 435 may identify power loss events and/or reduced power events, and the components of the broadband signal that are output for receipt by the households 425a-n may be adjusted based at least in part upon the identification of a power loss or reduced power event.

Those of ordinary skill in the art will appreciate that the gateway systems 100, 200, 300, 400 shown in and described with respect to FIGS. 1-4 are provided by way of example only. Numerous other operating environments, system architectures, and device configurations are possible. Other system embodiments can include fewer or greater numbers of components and may incorporate some or all of the functionality described with respect to the system components shown in FIGS. 1-4.

The described service gateways may provide an outside hardened solution for providing broadband services to one or more households. In other words, certain functionality that is normally situated within a household, such as the functionality of a broadband modem and/or router, may be moved outside of the household. For example, functionality may be moved to a cable tap that is situated outside of the household. As a result, relatively faster installation and/or activation of services for a household may be facilitated. For example, one or more services may be activated for a particular household by reconfiguring the modem, router, and/or a controller included in a service gateway to output different portions of a received broadband signal to the household 110.

Additionally, the requirement of positioning certain equipment, such as a modem and/or router, inside of a household is eliminated or reduced. Accordingly, the activation of services by a customer may be simplified because the customer does not have to install and/or initialize this equipment. Additionally, a technician may access and/or service the equipment without entering the household, thereby leading to relatively more efficient service calls. Further, by positioning equipment outside of the household, the likelihood that a customer will damage and/or remove service provider equipment (e.g., take a modem during a move) may be reduced. Additionally, in certain embodiments, the cost of the equipment may be split among several households. Accordingly, equipment upgrade costs may be split among several households. Additionally, as desired, the equipment may be scalable in order to facilitate the provision of services to any number of households.

Operational Overview

Figure 5:
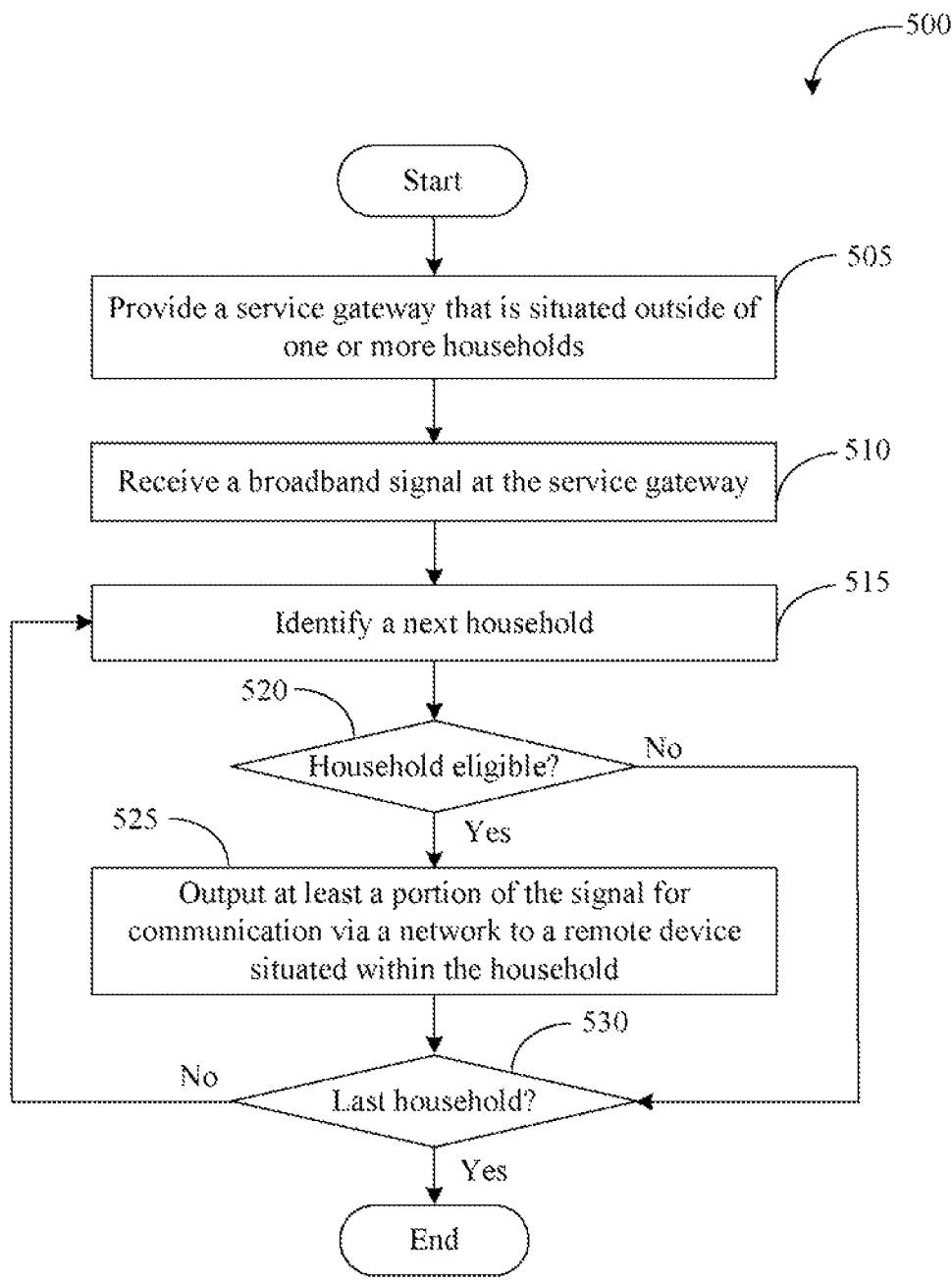
FIG. 5 is a flow diagram of an example method for providing broadband communication to one or more households, according to an illustrative embodiment of the invention.

FIG. 5 is a flow diagram of an example method 500 for providing broadband communication to one or more households, according to an illustrative embodiment of the invention. The method 500 may be performed by a suitable service gateway, such as one of the service gateways 105, 205, 305, 405 illustrated in FIGS. 1-4. The method 500 may begin at block 505.

At block 505, a service gateway may be provided. The service gateway may be situated outside of one or more households. For example, a service gateway similar to one or more of the service gateways 105, 205, 305, 405 illustrated in FIGS. 1-4 may be provided. As desired, the service gateway may include a modem and/or router that is configured to process a broadband signal and provide at least a portion of the broadband signal to the one or more households. In certain embodiments, the modem may be a multi-channel modem, and the router may be a multi-interface and/or multi-port router. Any number of other components may be incorporated into the service gateway, including but not limited to a termination component, one or more output ports, one or more controllers and/or processing components, an eMTA, one or more batteries, etc.

At block 510, a broadband signal may be received by the service gateway. For example, a broadband signal may be received from a suitable source, such as a cable feeder or a satellite dish, via a termination component associated with the service gateway. As desired in various embodiments, the received broadband signal may include a wide variety of components, for example, analog components, QAM components, digital components, etc. Additionally, the broadband signal may include data associated with one or more services that may be provided by the service gateway to the one or more households, for example, one or more television services (e.g., cable television service, satellite television service, on demand service), a telephone service, a security service, Internet service, etc.

As desired, the service gateway may process the received broadband signal and selectively output portions of the broadband signal to the one or more households and/or to specific devices situated within the one or more households. For example, the service gateway may determine one or more services that a household is eligible to receive, and the service gateway may selectively output the components of the broadband signal for receipt by the household based upon the determination. According to an aspect of the invention, each of the households and, as desired, individual remote devices situated within the households, may be individually addressable by the service gateway. At block 515, a next household (or next remote device) may be identified and/or selected by the service gateway.

At block 520, a determination may be made as to whether the identified household is eligible to receive at least a portion of the broadband signal from the service gateway. For example, the service gateway may access a customer profile associated with the household and/or the households that are eligible for one or more services provided by the service gateway, and the service gateway may determine whether the identified household is eligible based at least in part upon a review of the accessed information. If it is determined at block 520 that the identified household is not eligible to receive at least a portion of the broadband signal, then operations may continue at block 530 described below. For example, if it is determined that no services have been activated for the identified household, then operations may continue at block 530. If, however, it is determined at block 520 that the identified household is eligible to receive one or more services and/or at least a portion of the broadband signal, then operations may continue at block 525.

At block 525, at least a portion of the broadband signal may be output by the service gateway for communication to at least one remote device situated within the identified household. For example, a modem and/or router situated within the service gateway may selectively output one or more components or portions of the broadband signal for communication to one or more remote devices situated within the household. As desired, a network connection formed between the service gateway and the household devices may be utilized to facilitate the communication. The communication of at least a portion of the broadband signal to a remote household device may be based upon a wide variety of factors, for example, the services that the household and/or device are eligible to receive, the services that a user of the device is eligible to receive, and/or the type of recipient device (e.g., router, set-top box, network bridge, etc.). In certain embodiments, one or more customer profiles (e.g., household, device, and/or user profiles) and/or received user credentials may be evaluated in order to determine the services that should be communicated to a household device. In this regard, the component(s) or portions(s) of the broadband signal to be communicated may be determined and output. Operations may then continue at block 530.

At block 530, a determination may be made as to whether the identified household is the last household to be serviced or evaluated by the service gateway. If it is determined at block 530 that the identified household is not the last household, then operations may continue at block 515 and a next household may be identified for evaluations. If, however, it is determined at block 530 that the household is the last household, then operations may end.

The method 500 may end following block 530.

The operations described and shown in the method 500 of FIG. 5 may be carried out or performed in any suitable order as desired in various embodiments of the invention. Additionally, in certain embodiments, at least a portion of the operations may be carried out in parallel. For example, the determination of services to provide to multiple households may be carried out in parallel. Furthermore, in certain embodiments, less than or more than the operations described in FIG. 5 may be performed.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A service gateway to be situated outside of one or more households, the service gateway comprising:
    a termination component that connects to a source of a broadband data signal and receives the signal from the source, wherein the signal comprises of one of the following: i) a single channel Multimedia Over Coax Alliance (MoCA) signal or ii) a multi-channel MoCA signal;
    a filter that reduces feedback of the MoCA signal through the termination component;
    a broadband modem that receives the signal from the termination component; and
    a router in communication with the broadband modem that communicates at least a portion of the signal to one or more remote devices situated within the one or more respective households via a respective local area network.

2. The service gateway of claim 1, wherein the modem comprises one of a cable modem, a Digital Subscriber Line (DSL) modem, or a passive optical network (PON) modem.

3. The service gateway of claim 1, wherein the modem comprises one of (i) a single channel Digital Over Cable Service Interface Specification (DOCSIS) modem or (ii) a multi-channel DOCSIS modem.

4. The service gateway of claim 1, wherein the router comprises one of (i) a single channel Multimedia Over Coax Alliance (MoCA) interface or (ii) a multi-channel MoCA interface.

5. The service gateway of claim 1, wherein each of the one or more households is individually addressable.

6. The service gateway of claim 1, wherein the one or more remote devices comprise at least one of a Wi-Fi bridging device, an Ethernet bridging device, a router device, or a set-top box.

7. The service gateway of claim 1, wherein the components of the service gateway are powered by a power signal received from the source via the termination component.

8. The service gateway of claim 1, wherein the components of the service gateway are powered by a power bridge connected to an external power source.

9. The service gateway of claim 1, further comprising:
    an embedded Multimedia Terminal Adapter (eMTA) that is configured to provide telephone service to the one or more households.

10. A service gateway to be situated outside of a household, the service gateway comprising:
    a termination component that connects to a source of a broadband data signal and receives the signal from the source, wherein the signal comprises of one of the following: i) a single channel Multimedia Over Coax Alliance (MoCA) signal or ii) a multi-channel MoCA signal;
    a filter that is configured to reduce feedback of the MoCA signal through the termination component; and
    a broadband modem that receives the signal from the termination component and provides at least a portion of the signal to a remote device situated within the household via a network.

11. The service gateway of claim 10, wherein the remote device comprises a router situated within the household.

12. The service gateway of claim 10, further comprising:
    an embedded Multimedia Terminal Adapter (eMTA) that is configured to provide telephone service to the household.

13. The service gateway of claim 10, wherein the components of the service gateway are powered by a power bridge connected to the household.

14. The service gateway of claim 13, wherein the modem provides a lifeline eMTA service to the household in the event of a loss of power via the power bridge.

15. The service gateway of claim 10, wherein the modem comprises one of (i) a single channel Digital Over Cable Service Interface Specification (DOCSIS) modem or (ii) a multi-channel DOCSIS modem.

16. A service gateway to be situated outside of a household, the service gateway comprising:
    a termination component that connects to a source of a broadband data signal and receives the signal from the source, wherein the signal comprises of one of the following: i) a single channel Multimedia Over Coax Alliance (MoCA) signal or ii) a multi-channel MoCA signal;
    a filter that reduces feedback of the MoCA signal through the termination component;
    a broadband modem that receives the signal from the termination component; and
    a router in communication with the broadband modem that provides at least a portion of the signal to a remote device situated within the household via a local area network.

17. The service gateway of claim 16, wherein the remote device comprises at least one of a Wi-Fi bridging device, an Ethernet bridging device, a router device, or a set-top box.

18. The service gateway of claim 16, further comprising:
an embedded Multimedia Terminal Adapter (eMTA) that is configured to provide telephone service to the household.

19. The service gateway of claim 16, wherein the components of the service gateway are powered by a power bridge connected to the household.

20. The service gateway of claim 19, wherein the modem provides a lifeline eMTA service to the household in the event of a loss of power via the power bridge.

21. The service gateway of claim 16, wherein the modem comprises one of (i) a single channel Digital Over Cable Service Interface Specification (DOCSIS) modem or (ii) a multi-channel DOCSIS modem.

22. A method, comprising:
providing a service gateway that is situated outside of a household, wherein the service gateway comprises a termination component and a broadband modem in communication with the termination component;
receiving, by the termination component from a source, a broadband signal;
outputting, by the modem, at least a portion of the signal for communication via a network to a remote device situated within the household, wherein the outputting at least a portion of the broadband signal comprises outputting a Multimedia Over Coax Alliance (MoCA) signal; and
reducing a leakage of the MoCA signal through the termination component.

23. The method of claim 22, wherein providing a service gateway further comprises providing a service gateway including a router in communication with the broadband modem.

24. The method of claim 23, wherein providing a service gateway including a router comprises providing a service gateway that includes a routing have a multi-channel interface configured to communicate with a plurality of remote devices situated within a respective plurality of households.

25. The method of claim 22, further comprising:
identifying the household as an eligible household that is permitted to receive the at least a portion of the signal, wherein the at least a portion of the signal is output based upon the identification.

26. The method of claim 22, wherein providing a service gateway comprising a broadband modem comprises providing a service gateway including one of a cable modem, a Digital Subscriber Line (DSL) modem, or a passive optical network (PON) modem.

27. The method of claim 22, wherein providing a service gateway comprising a broadband modem comprises providing a service gateway including a Digital Over Cable Service Interface Specification (DOCSIS) modem.

28. The method of claim 22, wherein outputting at least a portion of the signal to a remote device comprises outputting at least a portion of the signal to one of a Wi-Fi bridging device, an Ethernet bridging device, a router device, or a set-top box.

29. The method of claim 22, further comprising:
powering the service gateway via a power signal received from the source via the termination component.

30. The method of claim 22, further comprising:
powering the service gateway via a power bridge connected to the household.

31. The method of claim 30, further comprising:
identifying a loss of power via the power bridge; and
altering an operation mode of the broadband modem to a reduced power operation mode that provides a lifeline eMTA service to the household.

32. The method of claim 22, wherein providing a service gateway further comprises providing a service gateway including an embedded Multimedia Terminal Adapter (eMTA) that is configured to provide telephone service to the household.

* * * * *